United States Patent
Pelicia et al.

(10) Patent No.: US 10,742,052 B1
(45) Date of Patent: Aug. 11, 2020

(54) SYSTEM FOR SYNCHRONOUSLY DISCHARGING MULTIPLE CAPACITIVE LOADS

(71) Applicant: NXP USA, Inc., Austin, TX (US)

(72) Inventors: Marcos Mauricio Pelicia, Campinas (BR); Andre Luis Vilas Boas, Amparo (BR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/410,597

(22) Filed: May 13, 2019

(51) Int. Cl.
*H02J 7/00* (2006.01)
*H02J 7/34* (2006.01)

(52) U.S. Cl.
CPC .......... *H02J 7/0063* (2013.01); *H02J 7/0013* (2013.01); *H02J 7/0016* (2013.01); *H02J 7/345* (2013.01); *H02J 2007/0067* (2013.01)

(58) Field of Classification Search
CPC ................... H02J 7/0063; H02J 7/0013; H02J 2007/0067; H02J 7/345; H02J 7/0016; G05F 1/56; G05F 1/562; G05F 1/563; G05F 1/565; G05F 1/577; G05F 1/613; G05F 3/185; G05F 1/618
See application file for complete search history.

(56) References Cited

U.S. PATENT DOCUMENTS 7,049,756 B2    5/2006  Aiba et al.
9,350,198 B2 *  5/2016  Gao .................. H02J 7/0016

OTHER PUBLICATIONS

Lagojevic, Milovan, Martin Cochet, Ben Keller, Philippe Flatresse, Andrei Vladimirescu, and Borivoje Nikolić; STMicroelectronics, Crolles Dept. of EECS; University of California, Berkeley Institut Supérieur d'Électronique de Paris; "A Fast, Flexible, Positive and Negative Adaptive Body-Bias Generator in 28nm FDSOI"; 2016 Symposium on VLSI Circuits of Digest Technical Papers; 2 pp.

* cited by examiner

*Primary Examiner* — Jung Kim

(57) ABSTRACT

An apparatus and method for synchronously discharging multiple capacitive loads. In one embodiment, the apparatus includes first and second discharge circuits for discharging first and second capacitive loads, respectively. The apparatus also includes a control circuit coupled to the first and second discharge circuits and configured to control the second discharge circuit. The control circuit includes a first scaler circuit configured to generate a first scaled voltage based on a first voltage on the first capacitive load, a second scaler circuit configured to generate a second scaled voltage based on a second voltage on the second capacitive load, and a comparator circuit for comparing the first and second scaled voltages. The comparator circuit asserts a control signal when the second scaled voltage exceeds the first scaled voltage. The second discharge circuit discharges the second capacitive load when the comparator circuit asserts its control signal.

12 Claims, 8 Drawing Sheets

SYSTEM FOR SYNCHRONOUSLY DISCHARGING MULTIPLE CAPACITIVE LOADS

BACKGROUND

A capacitor is a passive two-terminal electronic component that stores electrical energy in an electric field. The effect of a capacitor is known as capacitance. While some capacitance exists between any two electrically charged conductors in proximity in a circuit, a capacitor is a component designed to add capacitance to a circuit. Most capacitors contain at least two electrical conductors often in the form of metallic plates or surfaces separated by a dielectric medium. The nonconducting dielectric acts to increase the capacitor's charge capacity. Capacitive elements, which include capacitors, typically present linear characteristics between stored charge and terminal voltages. But the relation between charge and voltage may be nonlinear for certain capacitive elements. In other words some capacitive elements may behave in a nonlinear fashion.

Automation, power efficiency, sensing resolution, complexity, etc., has led to systems that are more distributed. For example, integrated circuits can be partitioned by power domains, and power provided to these domains are gated for power savings. Other distributive systems include independent and remotely located units, or multiple cores. There are also systems with multiple power supplies. Distributive systems may contain multiple capacitive loads. A capacitive load can be seen as one or more interconnected capacitive elements. Distributive capacitive loads can present problems (e.g., power overload, data corruption, etc.) during power up or power down. An uncontrolled power down of, for example, a system with multiple power supplies that drive respective capacitive loads, may result in structural damage.

An example distributive system is depicted in FIG. 1 to illustrate damage that can occur to power supplies when capacitive loads are not properly discharged during a power down operation. FIG. 1 shows a multiple power supply system 100 that includes a pair of voltage regulators 102 and 104 that provide power to respective subsystems, each of which can be characterized as having a capacitive load. In FIG. 1, the capacitive loads are designated C1 and C2, respectively. Coupling capacitor C0, connected to V1 and V2 is part of the complex load of the regulators, together with respective capacitive loads C1 and C2. Each of the capacitive loads C1 and C2 may be linear or nonlinear. In the illustrated example voltage regulator 102 drives its subsystem, and hence its capacitive load C1, to a negative voltage V1. In contrast, voltage regulator 104 drives its subsystem, and hence its capacitive load C2 to a positive voltage V2. Voltage regulators 102 and 104 may be powered down at the same time. When this happens, node 106 may suddenly be driven to a negative voltage via coupling capacitor C0. This negative voltage on node 106 may damage one or more components of voltage regulator 104 and render it permanently inoperable.

BRIEF DESCRIPTION OF THE DRAWINGS

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

Figure 2:
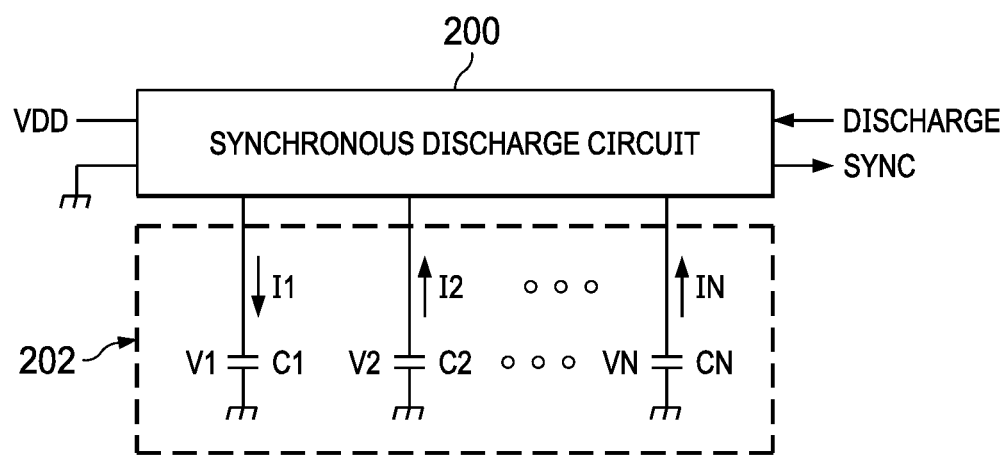
FIG. 2 is a block diagram illustrating a synchronous discharge circuit for synchronously discharging a plurality of capacitive loads according to one embodiment of the present disclosure.

As noted above, an uncontrolled power down of a distributive system with multiple capacitive loads could result in structural damage, loss of data, etc. FIG. 2 illustrates a block diagram of a synchronous discharge circuit 200 that addresses this problem and others. More particularly, FIG. 2 illustrates a synchronous discharge circuit (SD) 200, which is configured to synchronously discharge multiple capacitive loads according to one embodiment of the present disclosure. SD circuit 200 is connected to a distributed capacitive load system 202 containing capacitive loads C1 through CN. SD circuit 200 and distributed capacitive load system 202 may be contained in the same IC or in separate ICs.

Each of the capacitive loads in system 202 can be charged to a positive or negative voltage with respect to ground (i.e., 0 V). SD circuit 200 can synchronously discharge two or more capacitive loads to a target end voltage (TEV). As will be more fully described below "synchronously discharging"

capacitive loads means discharging capacitive loads at proportional rates so that their voltages reach a TEV at substantially the same point in time.

In one embodiment, SD circuit 200 can synchronously discharge a first group of capacitive loads to a first target end voltage TEV1 (e.g., 0 V), while discharging a second group of one or more capacitive loads to a second target end voltage TEV2 (e.g., 1 V). In this embodiment, the one or more capacitive loads of the second group may be discharged to TEV2 before the capacitive loads of the first group are discharged to TEV1. For the purposes of explanation only, the present disclosure will be described with reference to SD circuit 200 synchronously discharging all capacitive loads C1 through CN to TEV=0 V, except where noted.

SD circuit 200 can synchronously discharge capacitive loads of different capacitances that have the same or different start voltages. The term "start voltage" means the voltage across a capacitive load at the start of the synchronous discharge process. Capacitive loads C1 through CN are presumed to hold distinct start voltages VS1 through VSN, respectively. One or more of the start voltages VS1 through VSN, may be positive or negative (i.e., less than 0 V).

SD circuit 200 can synchronously discharge two or more linear capacitive loads, two or more nonlinear capacitive loads, or a mix of linear and nonlinear capacitive loads. For the purposes of explanation only, capacitive loads C1 through CN are linear, except where noted. Capacitive loads C1 through CN are presumed to have distinct capacitances, except where noted. For ease of illustration, the present disclosure will be described with reference to synchronously discharging C1, C2 and CN, it being understood that other capacitive loads within distributed capacitor system 202 are similarly discharged.

Figure 3:
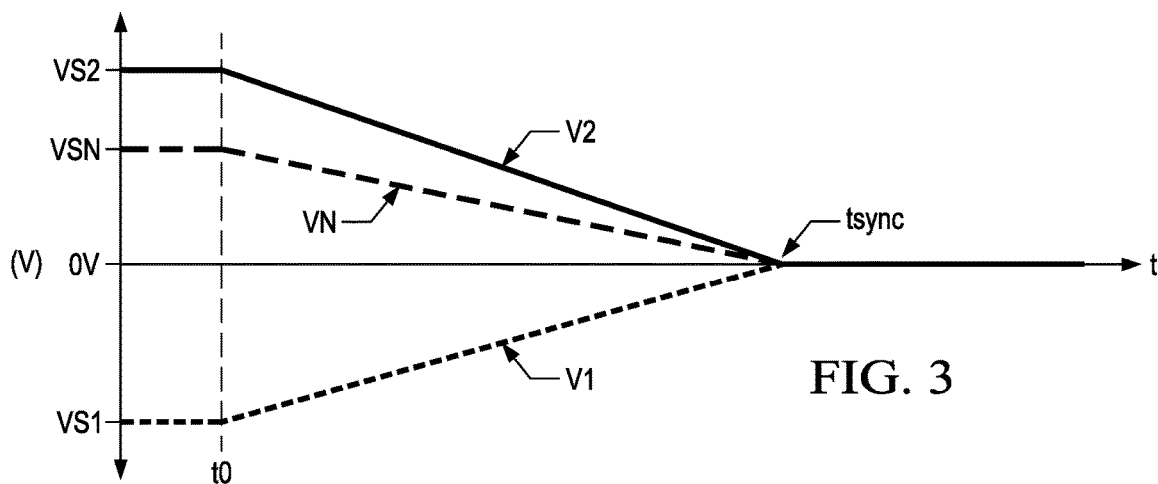
FIG. 3 illustrates voltages across capacitive loads during an example synchronous discharge process according to one embodiment of the present disclosure.

FIG. 3 illustrates the voltages V1, V2, and VN across capacitive loads C1, C2 and CN, respectively, as they are synchronously discharged by SD circuit 200. Capacitive loads C1, C2 and CN are initially charged to start voltages V1=VS1, V2=VS2, and VN=VSN, respectively. In the illustrated example VS1 is negative, and the magnitude of VS1 is greater than the magnitudes of VS2 and VSN. The voltages across capacitive loads C2 and CN decrease while the voltage across capacitive load C1 increases as the capacitive loads discharge. SD circuit 200 provides the currents I1, I2 and IN for discharging capacitive loads C1, C2 and CN, respectively.

Figure 1:
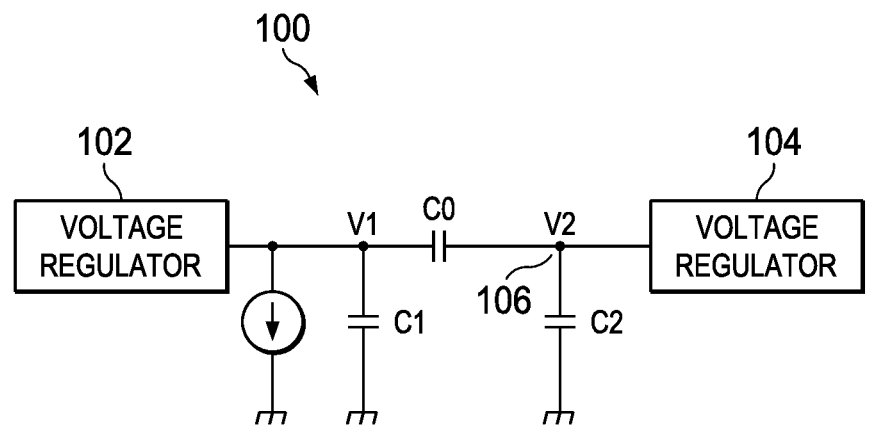
FIG. 1 illustrates a multiple regulator system supplying a coupled load.

SD circuit 200 begins the synchronous discharge process in response to an assertion of a DISCHARGE signal at time t0. More particularly, SD circuit 200 begins to discharge capacitive loads C1, C2 and CN using discharge currents I1, I2 and IN, respectively, at t0. As will be more fully described below, I1 is provided by a constant current source contained within SD circuit 200, and as a result V1 increases linearly between start voltage VS1 and target end voltage TEV=0 V. The rate at which V1 discharges depends on the magnitude of discharge current I1. In one embodiment I2 and IN are provided by a digitally controlled constant current sources contained within circuit 200, it being understood the present disclosure should not be limited thereto. V2 and VN decrease in substantially linear fashion to target end voltage TEV=0V. The synchronous discharge process ends when voltages V1, V2, and VN effectively reach 0V at substantially the same point in time tsync. SD circuit 200 asserts output signal SYNC at tsync. SD circuit 200 provides several advantages. In case of coupled regulators systems (like in FIG. 1), the SD circuit connected on V1 and V2 allows a controlled discharge on V1 that limits the coupling influence of capacitance C0 on V2. In addition a PWM controlled current source, which is more fully described below, can discharge the additional current provided by C0, thereby controlling V2 discharge.

Figure 5:
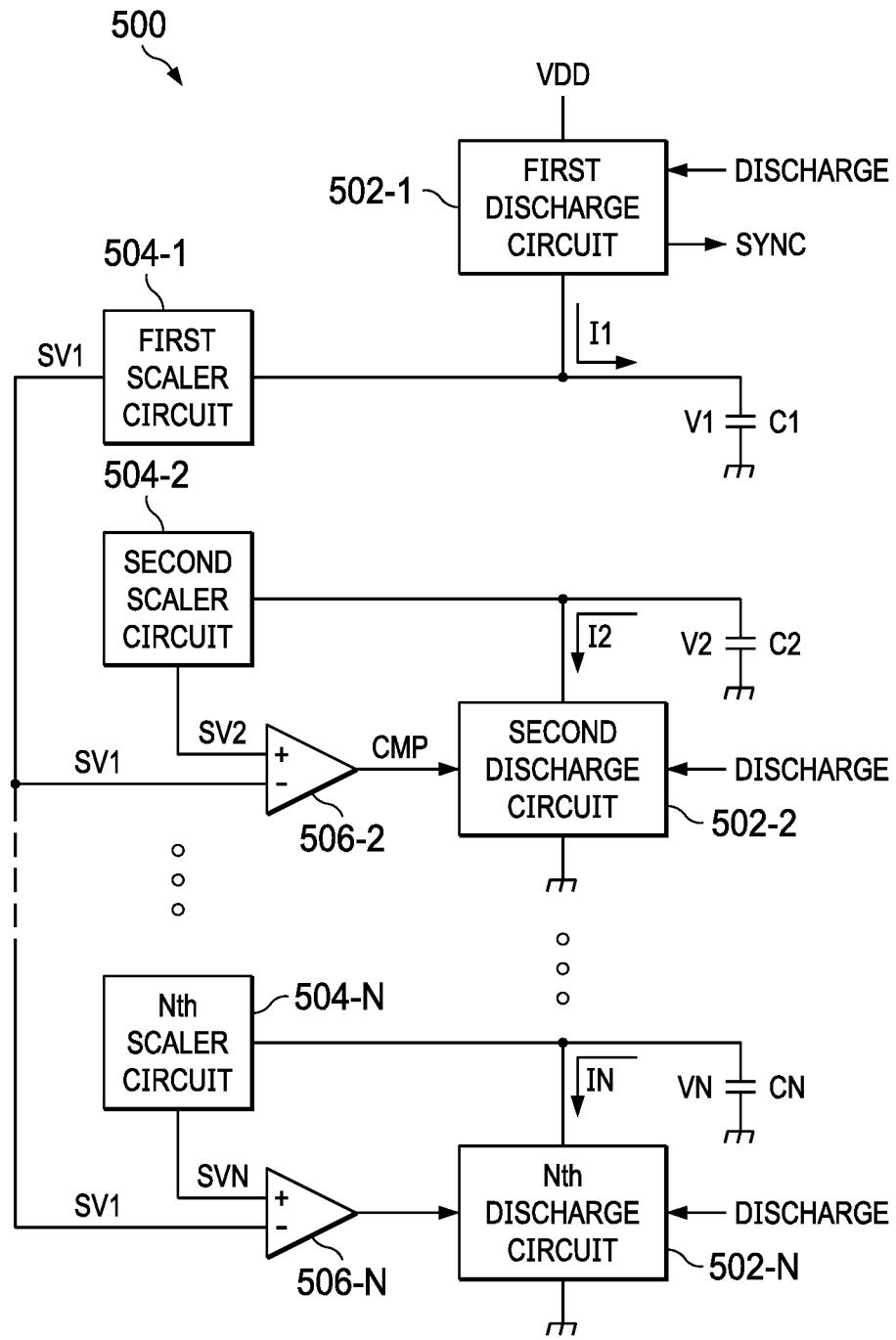
FIG. 5 is a block diagram illustrating details of the synchronous discharge circuit of FIG. 2 according to one embodiment of the present disclosure.

With continuing reference to FIGS. 2 and 3, FIG. 5 illustrates relevant components of an example SD circuit 200 according to one embodiment of the present disclosure. SD circuit 500 includes discharge circuits 502-1, 502-2, and 502-N for discharging capacitive loads C1, C2 and CN, respectively using discharge currents I1, I2, and IN, respectively. SD circuit 500 also includes scaler circuits 504-1, 504-2, and 504-N, and compare circuits 506-2 and 506-N.

Scaler circuits 504-1, 504-2, and 504-N are coupled as shown to receive capacitive load voltages V1, V2, and VN, respectively. V1, V2, and VN vary within voltage ranges VR1, VR2, and VRN, respectively, which in turn vary from each other. For example, voltage V1 may vary in range VR1 that is bound by −2 V and 0 V (i.e., VR1=[−2V, 0V]; {V1|−2V≤V1≤0V}), while voltage V2 may vary in a different range VR2 that is bound by 0 V and 3 V (i.e., VR2=[0V, 3V]; {V2|0V≤V2≤3V}). VR1 Scaler circuits 504-1, 504-2, and 504-N scale input voltage ranges VR1, VR2, and VRN, respectively, to a common voltage range CVR. For example, scaler circuit 504-1 may be configured to scale VR1=[−2V, 0V] to CVR=[0V, 1V], and scaler circuit 504-2 may be configured to scale VR2=[0V, 3V] to CVR=[0V, 1V]. Scaler circuits 504-1, 504-2, and 504-N generate scaled voltages SV1, SV2, and SVN, respectively, based on V1, V2, and VN, respectively. Scaled voltages SV1, SV2, and SVN are positive, proportional to capacitive load voltages V1, V2, and VN, respectively, and in the same common output range. As shown in FIG. 3, voltages V1, V2, and VN discharge at rates that are different but proportional to each other while C1, C2 and CN are being synchronously discharged. Since scaler circuits scale their input voltage ranges to a common output voltage range CVR, scaled voltages SV1, SV2, and SVN substantially mirror each other while capacitive loads C1, C2 and CN, respectively, are synchronously discharged to TEV. Scaler circuits 504-1, 504-2, and 504-N may take any one of many different embodiments. They can be implemented as voltage dividers, down-shifters, etc., depending upon the input voltage range VR to be scaled to common voltage range CVR.

Discharge circuit 502-1 begins discharging capacitive load C1 using I1 in response to an assertion of the DISCHARGE signal. In the illustrated example start voltage VS1 is negative. I1 is substantially constant during most of the synchronous discharge time interval (i.e., between t0 and tsync). Discharge circuit 502-1 monitors V1. When V1 reaches target end voltage TEV=0 V at tsync, discharge circuit 502-1 asserts the SYNC signal.

Discharge circuits 502-2 and 502-N are controlled by compare circuits 506-2 and 506-N, respectively, when the DISCHARGE signal is asserted. Although not shown, compare circuits 506 are also controlled by the DICHARGE signal. In other words, compare circuits 506 activate when the DISCHARGE signal is asserted. Compare circuit 506-2 compares scaled voltages SV1 and SV2 and asserts its output signal only when scaled voltage SV2 exceeds scaled voltage SV1. Compare circuit 506-N compares scaled voltages SV1 and SVN, and asserts its output signal only when scaled voltage SVN exceeds scaled voltage SV1. Discharge circuits 502-2 and 502-*n* discharge capacitive loads C2 and CN, respectively, using I2 and IN, respectively, when compare circuits 506-2 and 506-N assert their output signals. Discharge circuits 502-2 and 502-N reference discharge circuit 502-1 in that discharge circuits 502-2 and 502-N discharge capacitive loads C2 and CN based on the rate at which discharge circuit 502-1 discharges capacitive load C1. As such, discharge circuits 502-1, 502-2, and 502-N discharge capacitive loads C1, C2 and CN at rates that are proportional to each other during the synchronous discharge process.

Figure 4:
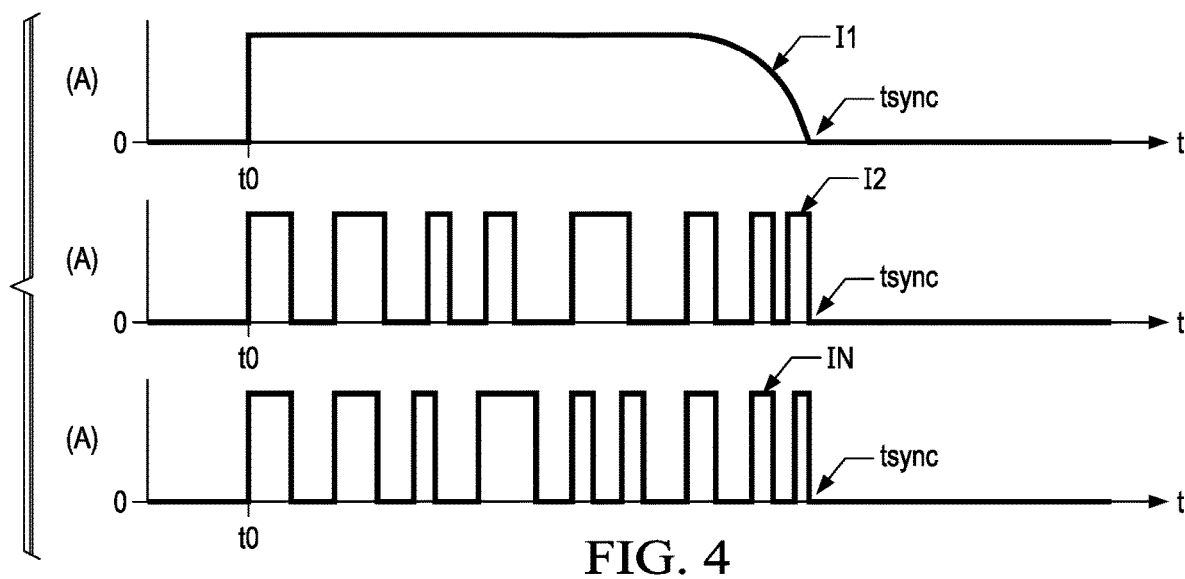
FIG. 4 illustrates currents used for discharging the capacitive loads during an example synchronous discharge process according to one embodiment of the present disclosure.

With continuing reference to FIGS. 3 and 5, FIG. 4 illustrates discharge currents I1, I2 and IN during the synchronous discharge process. Circuit 502-1 discharges capacitive load C1 using a constant discharge current I1 for most of the time interval Δt=tsync−t0. Discharge currents I2 and IN are digitally controlled by compare circuit 506-2 and 506-N, respectively. In other words, discharge circuits 502-2 and 502-N activate and deactivate with the outputs of compare circuit 506-2 and 506-N, respectively, as noted above. As a result discharge circuits 502-2 and 502-N discharge capacitive loads C2 and CN, respectively, with pulsed discharge currents I2 and IN, respectively, during the synchronous discharge time interval. As seen in FIG. 4, discharge currents I2 and IN are constant during each pulse during most of the synchronous discharge time interval Δt=tsync−t0. As V1, V2, and VN approach the target end voltage TEV=0 V, I1 quickly reduces.

Capacitive loads C1, C2 and CN are synchronously discharged to TEV=0 V at substantially the same point in time tsync. In General, the time T needed to discharge a linear capacitive load C to 0 V using a continuous and constant current I is defined by T=(c·VS)/I, where c is the capacitance of C, and VS is the starting voltage. If all three discharge currents I1, I2 and IN were continuous and constant, then synchronous discharge during the time interval T=tsync−t0 can be achieved if:

$$(c1 \cdot VS1)/I1 = (c2 \cdot VS2)/I2 \quad (1)$$

$$(c1 \cdot VS1)/I1 = (cN \cdot VSN)/IN \quad (2)$$

where c1 is the capacitance of C1, c2 is the capacitance of C2, and cN is the capacitance of CN. Rearranging terms yields the following equalities:

$$I2 = I1(c2 \cdot VS1)/(c1 \cdot VS2) \quad (3)$$

$$IN = I1(cN \cdot VS1)/(c1 \cdot VSN) \quad (4)$$

FIG. 4 shows that I1 is substantially continuous and constant during the synchronous discharge process, but I2 and IN are not. Rather, I2 and IN are pulsed during the synchronous discharge process. However, C2 and CN can be synchronously discharged to 0 V by discharge circuits 502-2 and 502-N if the following inequalities are observed.

$$I2 > I1(c2 \cdot VS1)/(c1 \cdot VS2) \quad (5)$$

$$IN > I1(cN \cdot VS1)/(c1 \cdot V2N) \quad (6)$$

Discharge circuits 502-2 and 502-N should include digitally controlled constant current sources that provide I2 and IN with magnitudes defined by the foregoing inequalities. In other words, the digitally controlled constant current sources that provide I2 and IN should be configured according to inequalities (5) and (6). If any of capacitive loads (e.g., C2) is nonlinear, its maximal capacitance value (e.g., c2) should be used to calculate the minimal magnitude of its corresponding discharge current (e.g., I2).

Figure 6:
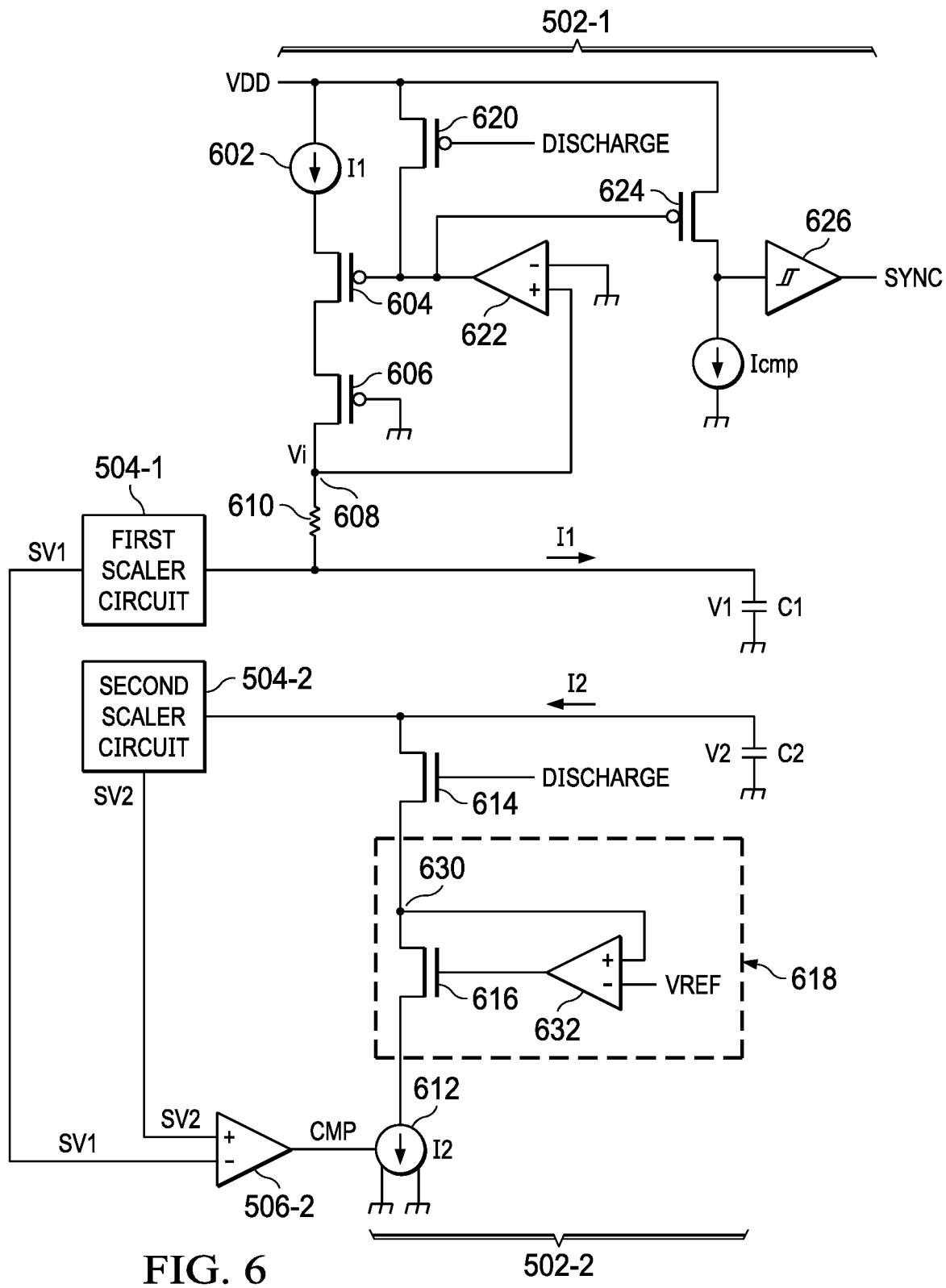
FIG. 6 is a schematic diagram of example discharge circuits employed in FIG. 5.

With continuing reference to FIG. 5, FIG. 6 illustrates example discharge circuits 502-1 and 502-2 in schematic form according to one embodiment of the present disclosure. Discharge circuit 502-1 includes a positive supply current source 602 that can provide constant current I1 for discharging negatively charged capacitive load C1. In contrast discharge circuit 502-2 includes a digitally controlled current source 612 that provides constant current I2, when activated, for discharging positively charged capacitive load C2. The magnitude of I2 depends on I1 and other variables as defined by equation (5) above. Although not shown in FIG. 6, discharge circuit 502-N of FIG. 5 can be almost identical to discharge circuit 502-2. There is at least one significant difference between discharge circuits 502-2 and 502-N; the digitally controlled source of discharge circuit 502-N, when activated, provides constant discharge current IN with a magnitude that is defined by equation (6) above.

Discharge circuit 502-1 includes PMOS transistor 620, which is coupled between supply voltage VDD and the gate of PMOS transistor 604. When the DISCHARGE signal is not asserted, PMOS transistor 620 is activated, which in turn deactivates PMOS transistor 604 so that no discharge current I1 can flow from constant current source 602 to C1 via activated PMOS transistor 606 and resistor 610. However, when DISCHARGE is asserted, PMOS transistor 620 is deactivated, and the gate of PMOS transistor 604 is driven by op amp 622, the inputs of which are connected to GND=0 V and voltage Vi at node 608. Op amp 622 activates PMOS transistor 604, which closes the current path between current source 602 and capacitive load C1 to start the synchronous discharge process. Resistor 610 is in the current path and limits the drain-to-source voltage of PMOS transistor 604, mainly during the beginning of the synchronous discharge process. Op amp 622 is part of a closed loop control that deactivates PMOS transistor 604 and opens the current path when Vi is substantially equal to TEV=0V. Op amp 622 also deactivates PMOS transistor 624, which changes the voltage input to Schmitt trigger circuit 626. In response, Schmitt trigger circuit 626 asserts its output (i.e. the SYNC signal). A Schmitt trigger circuit is used to reduce bounce on the SYNC signal due to noise.

Discharge circuit 502-2 includes optional closed-loop control circuit 618. If this closed loop control is not present, discharge circuit 502-2 can only discharge capacitive load C2 to target end voltage TEV=0 V. If closed-loop control 618 is present, discharge circuit 502-2 can discharge capacitive load C2 to a different target end voltage (e.g., TEV1=VREF=1 V). For the purposes of explanation only, discharge circuit 502-2 includes closed-loop control 618 with VREF=0 V. Accordingly, circuit 502-2 discharges capacitive load C2 to 0 V, the same TEV for capacitive load C1. When the DISCHARGE signal is asserted, NMOS transistor 614 is activated to complete a current path between C2 and digitally controlled current source 612. When activated by compare circuit 506-2, digitally controlled current source 612 discharges C2 by drawing constant current I2 therefrom. Closed-loop control 618 maintains the path for discharging capacitive load C2 until V1=0 V, at which point closed-loop control 618 closes the current path by deactivating NMOS capacitive load 616.

With continuing reference to FIG. 6, FIG. 7A through 7F illustrate example waveforms that may better explain "synchronously discharging" capacitive loads or discharging capacitive loads at substantially proportional rates so that their voltages reach a TEV at substantially the same point in time. These waveforms presume that the capacitances of C1 and C2 are equal to each other, and that the magnitude of start voltage VS1 across capacitive load C1 exceeds the magnitude of start voltage VS2. Given these presumptions, the magnitude of discharge current I2 should configured to exceed the magnitude of discharge current I1 in accordance with equation (5).

Figure 7A:
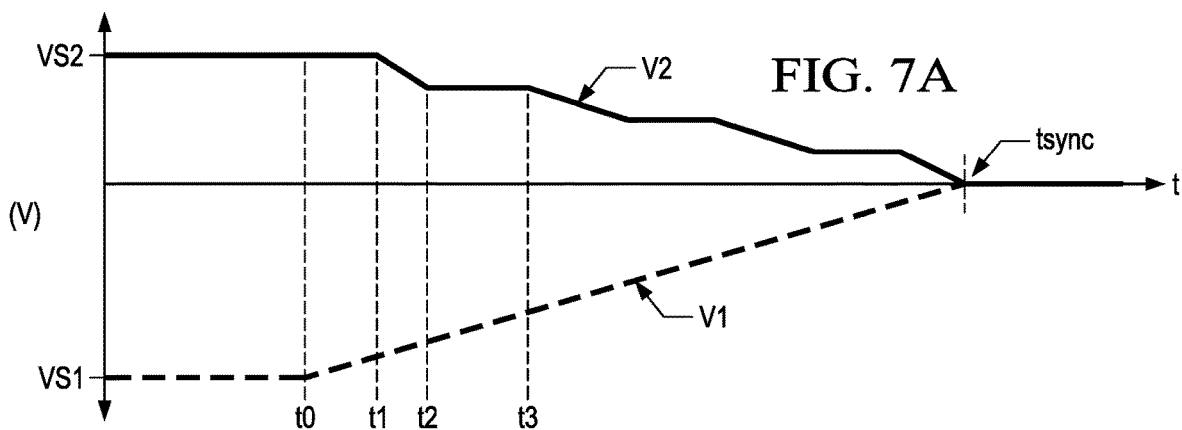
FIG. 7A-7D illustrate various waveforms generated by various components within FIG. 5 during an example synchronous discharge process.
Figure 7B:
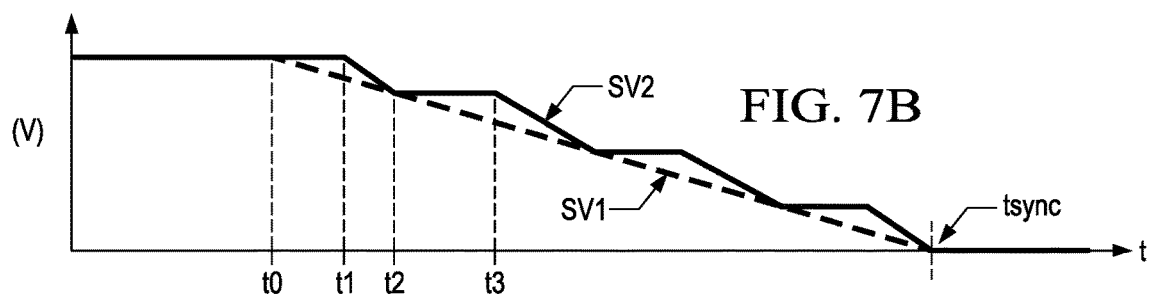

FIG. 7A illustrates voltages V1 and V2 during the synchronous discharge process. Before the synchronous discharge process begins, V1=VS1 and V2=VS2, with VS2 presumed negative and greater in magnitude than VS1. FIG. 7B illustrates scale voltages SV1 and SV2 generated by scaler circuits 504-1 and 504-2, respectively, based on V1 and V2, respectively. Scaler circuits 504-1 and 504-2 scale their input voltage ranges to a common voltage range, and as a result SV1 and SV2 initially match each other as shown.

Figure 7C:
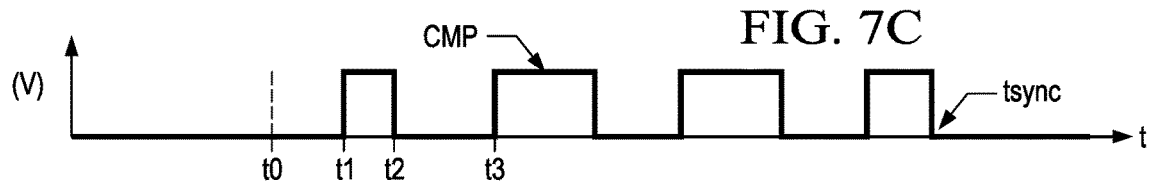
Figure 7D:
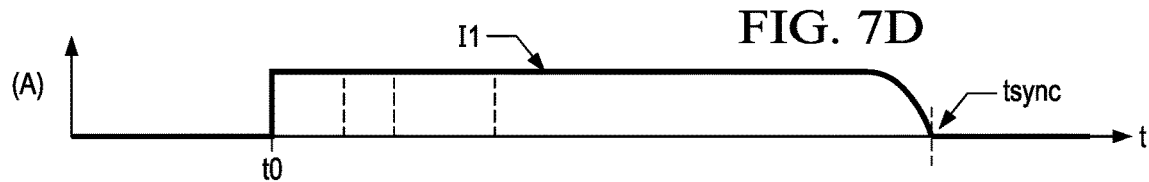

At time t0 the DISCHARGE signal is asserted and the synchronous discharge process begins with activation of PMOS transistor 604, which closes the I1 current path between current source 602 and negatively charged capacitive load C1. FIG. 7D illustrates current I1 while C1 is being discharged. V1 and SV1 respectively increase and decrease in linear fashion as capacitive load C1 is discharged by constant current I1. And V1 and SV1 will continue to linearly increase and decrease, respectively, until C1 is substantially discharged to 0 V at tsync.

Figure 7E:
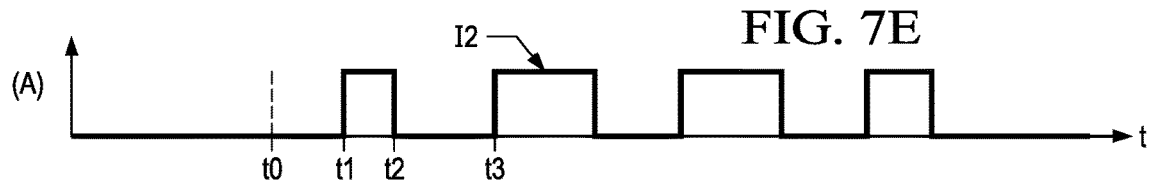
FIG. 7E shows a relationship between a CMP signal and a discharge current.
Figure 7F:
FIG. 7F illustrate example waveforms that may better explain "synchronously discharging" capacitive loads.

Although capacitive load C1 begins to discharge almost immediately at t0, there may be a small delay before capacitive load C2 begins to discharge via current I2. More particularly, current source 612 is initially deactivated, and the voltage at C2 will hold at VS2 until t1 when compare circuit 506-2 detects that SV2 is a threshold above SV1, at which point compare circuit 506-2 asserts its output CMP, which in turn activates current source 612. FIGS. 7C and 7E show the relationship between CMP and discharge current I2. Positively charged capacitive load C2 begins to discharge, which causes V2 and SV2 to start decreasing linearly. V2 and SV2 will continue to decrease until SV1 and SV2 are substantially equal at t2, at which point compare circuit 506-2 de-asserts CMP, which in turn deactivates current source 612. V2 and SV2 will hold constant while current source 612 is deactivated between t2 and t3. However, V1 and SV1 will continue to decrease between t2 and t3 as C1 discharges with I1 while current source 6,12 is deactivated. Eventually compare circuit 506-2 detects that SV2 exceeds SV1 by a threshold at time t3, at which point compare circuit 506-2 reasserts CMP, which in turn reactivates current source 612. This process continues until capacitive loads C1 and C2 are discharged to 0 V at time tsync, at which point op amps 622 and 632 close the discharge current paths by deactivating transistors 604 and 616, respectively, and Schmitt trigger 626 asserts its output signal SYNC.

FIG. 7B illustrates how scaled voltage SV2 closely follows SV1 during the synchronous discharge process. FIG. 7B along with FIG. 7A shows that V2 discharges at a substantially linear rate, which is proportional to the linear rate at which V1 discharges during the synchronous discharge process Importantly FIGS. 7A and 7B show that V1 and V2 reach target end voltage TEV=0 V at substantially the same point in time tsync.

FIGS. 2 and 5 illustrate one embodiment of a synchronous discharge circuit that is configured to synchronously discharge capacitive loads of system 202 in which capacitive load C1 is initially charged to a negative voltage, and capacitive load C2 is initially charged to a positive voltage. A synchronous discharge circuit can also be designed in accordance with the present disclosure to synchronously discharge capacitive loads of system 202 in which: both capacitive loads C1 and C2 are initially charged with distinct negative voltages; both capacitive loads C1 and C2 are initially charged with distinct positive voltages, or; capacitive loads C1 and C2 are initially charged with positive and negative voltages, respectively.

Figure 8A:
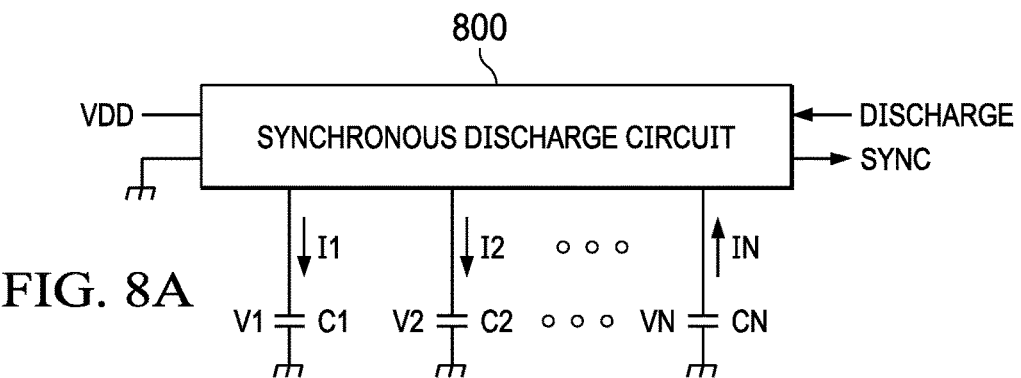
FIG. 8A is a block diagram illustrating a synchronous discharge circuit for synchronously discharging a plurality of capacitive loads according to one embodiment of the present disclosure.
Figure 8B:
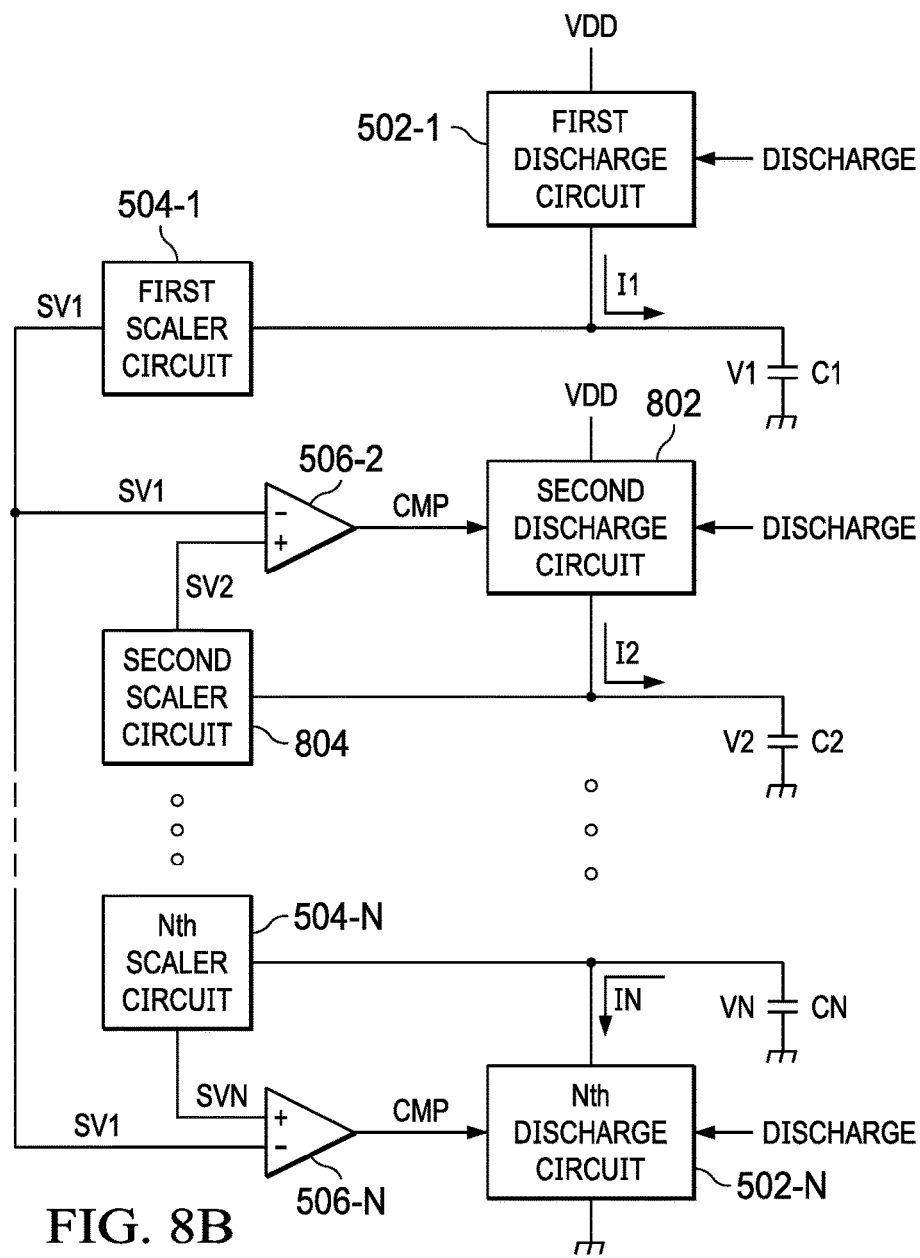
FIG. 8B is a block diagram illustrating details of the synchronous discharge circuit of FIG. 8A according to one embodiment of the present disclosure.

FIG. 8A illustrates a synchronous discharge circuit 800 that is configured to synchronously discharge capacitive loads C1 through CN, where capacitive loads C1 and C2 are initially charged to distinct negative voltages. FIG. 8B illustrates a more detailed view of the synchronous discharge circuit 800 shown in FIG. 8A. FIG. 8B includes many of the components shown in FIG. 5. However, significant differences exist. For example, the second discharge circuit 502-2 of FIG. 5 is replaced with discharge circuit 802 in FIG. 8B, and the second scaler circuit 504-2 in FIG. 5 is replaced with the scaler circuit 804. Scaler circuit 804 is coupled as shown to receive capacitive load voltage V2. V1 and V2 vary within voltage ranges VR1 and VR2, respectively. For example, voltage V1 may vary in range VR1 that is bound by −2 V and 0 V (i.e., VR1=[−2V, 0V] while voltage V2 may vary in a different range VR2 that is bound by −1 V and 0 V (i.e., VR2=[−1V, 0V]). VR1 Scaler circuits 504-1 and 804 scale input voltage ranges VR1 and VR2, respectively, to a common voltage range CVR. For example scaler circuit 504-1 may be configured to scale VR1=[−2V, 0V] to CVR=[0V, 1V], and scaler circuit 804 may be configured to scale VR2=[−1V, 0V] to CVR=[0V, 1V]. Scaler circuits 504-1 and 804 generate scaled voltages SV1 and SV2, respectively, based on V1 and V2, respectively. Scaled voltages SV1 and SV2 are positive and proportional to capacitive load voltages V1 and V2, respectively. Voltages V1 and V2 change at rates that are different but proportional to each other while C1 and C2 are being synchronously discharged. Scaled voltages SV1 and SV2 should substantially mirror each other while capacitive loads C1 and C2 are synchronously discharged to TEV.

Discharge circuit 502-1 begins discharging capacitive load C1 using current I1 in response to an assertion of DISCHARGE signal. Start voltage VS1 for capacitive load C1 is negative. Discharge current I1 flows into capacitive load C1 during the synchronous discharge time interval (i.e., between t0 and tsync). I1 is substantially constant during most of the synchronous discharge time interval. Discharge circuit 802 is controlled by compare circuit 802 when the DISCHARGE signal is asserted. Compare circuit 506-2 compares scaled voltages SV1 and SV2, and asserts its output signal only when scaled voltage SV2 exceeds scaled voltage SV1. Discharge circuit discharges capacitive loads C2 using I2 when compare circuit 506-2 asserts its output signal CMP, where I2>I1(c2·VS1)/(c1·VS2). Discharge circuit 802 references discharge circuit 502-1 in that discharge circuit 802 discharges capacitive load C2 based on the rate at which discharge circuit 502-1 discharges capacitive load C1. As such, discharge circuits 502-1 and 802 discharge capacitive loads C1 and C2 at rates that are proportional to each other during the synchronous discharge process.

Figure 9A:
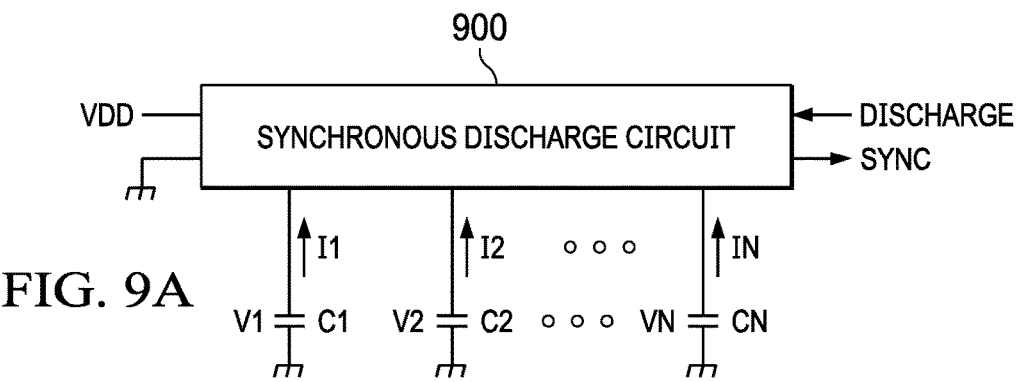
FIG. 9A is a block diagram illustrating a synchronous discharge circuit for synchronously discharging a plurality of capacitive loads according to one embodiment of the present disclosure.
Figure 9B:
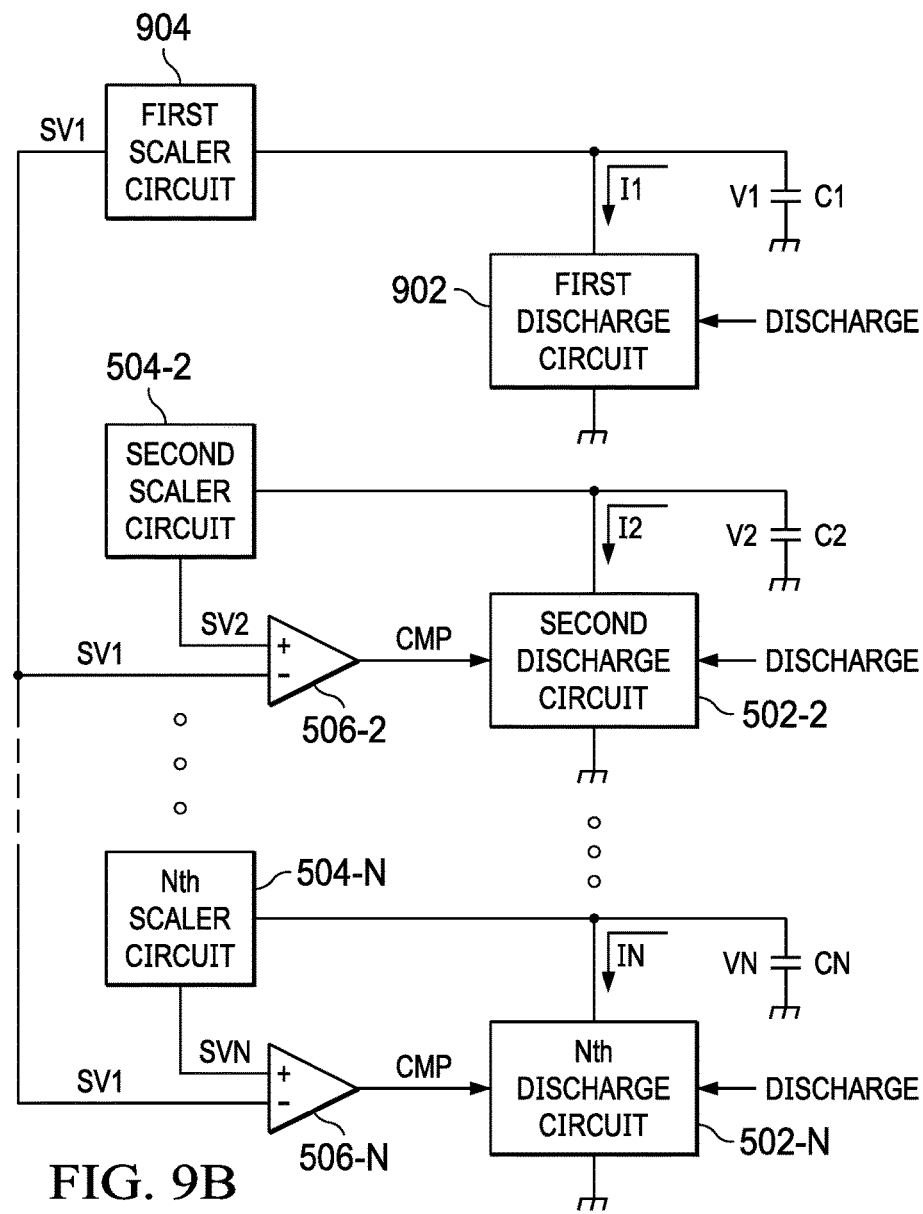
FIG. 9B is a block diagram illustrating details of the synchronous discharge circuit of FIG. 9A according to one embodiment of the present disclosure.

FIG. 9A illustrates a synchronous discharge circuit 900 that is configured to synchronously discharge capacitive loads C1 through CN, where capacitive loads C1 and C2 are initially charged to distinct positive voltages, respectively. FIG. 9B illustrates a more detailed view of the synchronous discharge circuit 900 shown in FIG. 9A. FIG. 9B includes many of the components shown in FIG. 5. However, significant differences exist. For example, discharge circuit 502-1 of FIG. 5 is replaced with discharge circuit 902 in FIG. 9B, and scaler circuit 504-1 in FIG. 5 is replaced with scaler circuit 904. Scaler circuit 904 is coupled to receive capacitive load voltage V1. V1 and V2 vary within voltage ranges VR1 and VR2, respectively. For example, voltage V1 may vary in range VR1 that is bound by 0 V and 2 V (i.e., VR1=[0V, 2V]), while voltage V2 may vary in a different range VR2 that is bound by 0 V and 3 V (i.e., VR2=[0V, 3V];

{V2|0V≤V2≤3V}). VR1 Scaler circuits 904 and 504-2 scale input voltage ranges VR1 and VR2, respectively, to a common voltage range CVR. For example scaler circuit 904 may be configured to scale VR1=[0V, 2V] to CVR=[0V, 1V], and scaler circuit 504-2 may be configured to scale VR2=[0V, 3V] to CVR=[0V, 1V]. Scaler circuits 904 and 504-2 generate scaled voltages SV1 and SV2, respectively, based on V1 and V2, respectively. Scaled voltages SV1 and SV2 are positive and proportional to capacitive load voltages V1 and V2, respectively. Voltages V1 and V2 change at rates that are different but proportional to each other while C1 and C2 are being synchronously discharged. Since scaler circuits scale their input voltage ranges to a common output voltage range CVR, scaled voltages SV1 and SV2 substantially mirror each other while capacitive loads C1 and C2 are synchronously discharged to TEV. Discharge circuit 902 begins discharging capacitive load C1 using current I1 in response to an assertion of DISCHARGE signal. In the illustrated example start voltage VS1 is positive. Discharge current I1 flows from capacitor C1 during the synchronous discharge time interval (i.e., between t0 and tsync). I1 is substantially constant during most of the synchronous discharge time interval.

Figures 10A, 10B:
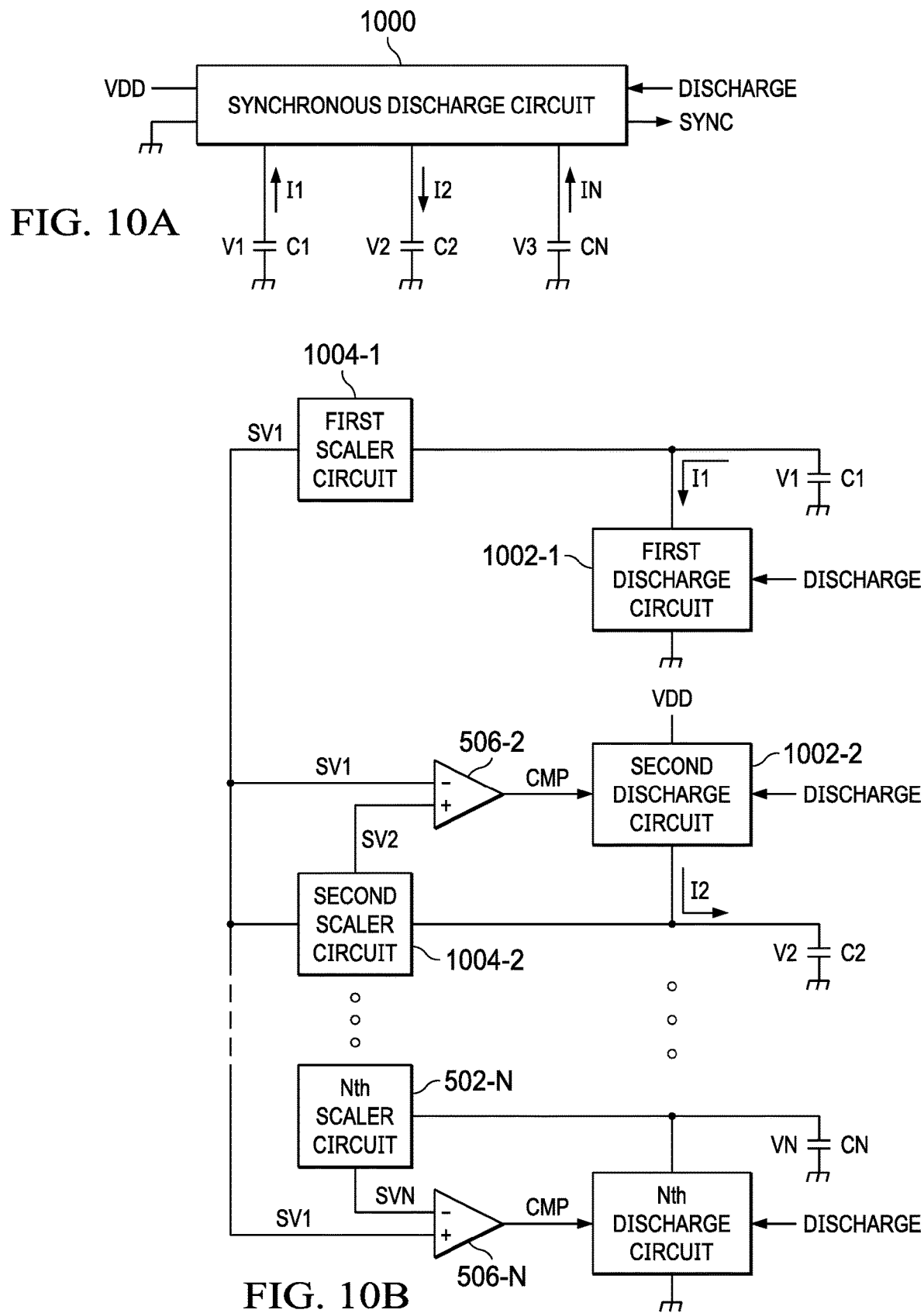
FIG. 10A is a block diagram illustrating a synchronous discharge circuit for synchronously discharging a plurality of capacitive loads according to one embodiment of the present disclosure.
FIG. 10B is a block diagram illustrating details of the synchronous discharge circuit of FIG. 10A according to one embodiment of the present disclosure.

FIG. 10A illustrates a synchronous discharge circuit 1000 that is configured to synchronously discharge capacitive loads C1 through CN, where capacitive loads C1 and C2 are initially charged to positive or negative voltages, respectively. FIG. 10B illustrates a more detailed view of the synchronous discharge circuit 1000 shown in FIG. 10A. FIG. 10B includes many of the components shown in FIG. 5. However, significant differences exist. For example, discharge circuits 502-1 and 502-2 of FIG. 5 are replaced with discharge circuits 1002-1 and 1002-2, respectively in FIG. 10B, and scaler circuits 504-1 and 504-2 are replaced with scaler circuits 1004-1 and 1004-2, respectively. Scaler circuits 1004-1 and 1004-2 are coupled as shown to receive capacitive load voltages V1 and V2, respectively. V1 and V2 vary within voltage ranges VR1 and VR2, respectively. For example, voltage V1 may vary in range VR1 that is bound by 0 V and 2 V (i.e., VR1=[0V, 2V]), while voltage V2 may vary in a different range VR2 that is bound by −3 V and 0 V (i.e., VR2=[−3V, 0V]). Scaler circuits 1004-1 and 1004-2 scale input voltage ranges VR1 and VR2, respectively, to a common voltage range CVR. For example scaler circuit 504-1 may be configured to scale VR1=[0V, 2V] to CVR=[0V, 1V], and scaler circuit 504-2 may be configured to scale VR2=[−3V, 0V] to CVR=[0V, 1V]. Scaler circuits 1004-1 and 1004-2 generate scaled voltages SV1 and SV2, respectively, based on V1 and V2, respectively. Scaled voltages SV1 and SV2 are positive and proportional to capacitive load voltages V1 and V2, respectively. Voltages V1 and V2 change at rates that are different but proportional to each other while C1 and C2 are being synchronously discharged. Since scaler circuits scale their input voltage ranges to a common output voltage range CVR, scaled voltages SV1 and SV2 should substantially mirror each other while capacitive loads C1 and C2 are synchronously discharged to TEV.

Discharge circuit 1002-1 begins discharging capacitive load C1 using I1 in response to an assertion of DISCHARGE signal. In the illustrated example start voltage VS1 is positive. Discharge current I1 flows out capacitive load C1. I1 is constant during most of the synchronous discharge time interval. Discharge circuits 1002-2 is controlled compare circuit 506-2, when the DISCHARGE signal is asserted. Compare circuit 506-2 compares scaled voltages SV1 and SV2, and asserts its output signal only when scaled voltage SV2 exceeds scaled voltage SV1. Discharge circuit 1002-2 discharges capacitive load C2 using I2 when compare circuit 506-2 assert its output signal CMP. VS2 is negative and discharge current I2 flows into capacitive load C2 during the synchronous discharge time interval (i.e., between t0 and tsync). Discharge circuit 1002-2 references discharge circuit 1002-1 in that discharge circuit 1002-2 discharges capacitive load C2 based on the rate at which discharge circuit 1002-1 discharges capacitive load C1. As such, discharge circuits 1002-1 and 1002-2 discharge capacitive loads C1 and C2 at rates that are proportional to each other during the synchronous discharge process.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
   a first discharge circuit for discharging a first capacitive load to ground voltage;
   a second discharge circuit for discharging a second capacitive load to ground voltage;
   a control circuit coupled to the first and second discharge circuits and configured to control the second discharge circuit;
   wherein the control circuit comprises:
   a first scaler circuit configured to generate a first scaled voltage based on a first voltage on the first capacitive load;
   a second scaler circuit configured to generate a second scaled voltage based on a second voltage on the second capacitive load;
   a comparator circuit for comparing the first and second scaled voltages, wherein the comparator circuit asserts a control signal when the second scaled voltage exceeds the first scaled voltage;
   wherein the second discharge circuit discharges the second capacitive load when the comparator circuit asserts its control signal.

2. The apparatus of claim 1:
   wherein the first scaler circuit limits the first scaled voltage to a common voltage range;
   wherein the second scaler circuit limits the second scaled voltage to the common voltage range.

3. The apparatus of claim 2:
   wherein the first voltage is limited to a first voltage range;
   wherein the second voltage is limited to a second voltage range;
   wherein the first, second and common voltage ranges are each different from each other.

4. The apparatus of claim 1 further comprising a discharge monitoring circuit configured to assert its output signal when the first or second capacitive load is substantially discharged.

5. The apparatus of claim 1 further comprising:
   a first charging circuit for charging the first capacitive load to a first voltage level before the first discharge circuit begins discharging the first capacitive load;
   a second charging circuit for charging the second capacitive load to a second voltage level before the second discharge circuit begins discharging the second capacitive load;
   wherein the first and second voltage levels are different from each other.

6. The apparatus of claim 5:
wherein the first discharge circuit comprises a first current source for providing a first current for discharging the first capacitive load;
wherein the second discharge circuit comprises a second current source for providing a second current for discharging the second capacitive load when the control signal is asserted;
wherein a magnitude of the second current depends on a capacitance of the first capacitive load, a capacitance of the second capacitive load, a magnitude of the first current, the first voltage level, and a magnitude of the second voltage level.

7. The apparatus of claim 6 further comprising:
a first switch coupled between the first current source and the first capacitive load, wherein the first switch, when closed, transmits the first current between the first current source and the first capacitive load;
a first circuit for controlling the first switch based on the first voltage.

8. The apparatus of claim 7 further comprising:
a second switch coupled between the second current source and the second capacitive load, wherein the second switch, when closed, transmits the second current between the second current source and the second capacitive load;
a second circuit for controlling the second switch based on the second voltage and a reference voltage.

9. The apparatus of claim 1 wherein:
the first capacitive load comprises a linear capacitive load;
the second capacitive load comprises a non-linear capacitive load.

10. The apparatus of claim 1:
wherein the first discharge circuit comprises a first current source for providing a first constant current for discharging the first capacitive load;
wherein the second discharge circuit comprises a second current source for providing a second constant current for discharging the second capacitive load when the control signal is asserted;
wherein the second constant current is greater in magnitude than a magnitude of the first constant current;
wherein the magnitude of the second constant current is proportional to the magnitude of the first constant current.

11. An integrated circuit (IC) comprising:
a first discharge circuit for discharging a first capacitive load to ground voltage;
a second discharge circuit for discharging a second capacitive load to ground voltage;
a control circuit for controlling the second discharge circuit;
wherein the control circuit comprises:
a first scaler circuit coupled to the first capacitive load and configured to generate a first output voltage that is proportional to a voltage on the first capacitive load;
a second scaler circuit coupled to the second capacitive load and configured to generate a second output voltage that is proportional to a voltage on the second capacitive load;
a comparator circuit for comparing the first and second output voltages, wherein the comparator asserts a control signal when the second output voltage exceeds the first output voltage;
wherein the second discharge circuit discharges the second capacitive load when the comparator circuit asserts its control signal.

12. The IC of claim 11:
wherein the first scaler circuit is configured to convert a first input voltage range into a common voltage range, wherein the first input and common voltage ranges are different from each other
wherein the second scaler circuit is configured to convert a second input voltage range into the common voltage range, wherein the second input range and the common voltage range are different from each other, and wherein the first and second input voltage ranges are different from each other.

* * * * *